United States Patent [19]

Zambrano

[11] Patent Number: 4,478,803
[45] Date of Patent: Oct. 23, 1984

[54] DRY SCRUBBING OF $SO_2$ FROM MIXTURES

[75] Inventor: Adolfo R. Zambrano, Hibbing, Minn.

[73] Assignee: The Hanna Mining Company, Cleveland, Ohio

[21] Appl. No.: 464,752

[22] Filed: Feb. 7, 1983

[51] Int. Cl.³ .......................... B01J 8/00; C01B 17/00
[52] U.S. Cl. .................................... 423/244; 423/242; 423/539; 423/561 R; 252/191
[58] Field of Search .......... 423/242 A, 242 R, 244 A, 423/244 R, 561 R, 539; 252/191

[56] References Cited

U.S. PATENT DOCUMENTS

| | | | |
|---|---|---|---|
| 1,412,452 | 4/1922 | Coolbaugh | 423/244 |
| 2,086,237 | 7/1937 | Pfanstiel | 23/126 |
| 2,306,425 | 12/1942 | Bevan | 23/126 |
| 3,917,800 | 11/1975 | McGauley et al. | 423/244 |
| 3,987,146 | 10/1976 | Clay et al. | 423/561 R |
| 4,008,169 | 2/1977 | McGauley | 252/191 |
| 4,010,239 | 3/1977 | Dor | 423/244 |
| 4,061,716 | 12/1977 | McGauley | 423/244 |
| 4,238,466 | 12/1980 | Zambrano et al. | 423/244 |

FOREIGN PATENT DOCUMENTS 400387 10/1933 United Kingdom ................ 252/191

OTHER PUBLICATIONS

The Condensed Chemical Dictionary, 6th ed., 1962, pp. 136, 821.
S. A. Ayer, Editor, Proceedings: Symposium on Flue Gas Desulfurization–Houston, Oct. 1980; vol. 2, pp. 761–776 (EPA–600/9–81–019D, Apr., 1981).
P. Bolsaitis et al., "Kinetics of Sulfidization of Iron Oxide with $SO_2$–CO Mixtures of High Sulfur Potential", vol. 11B Metallurgical Transactions, 185–197 (American Society for Metals and the Metallurgical Society of AIME, Jun. 1980).
F. A. Cotton et al., Advanced Inorganic Chemistry, Third Ed., at 433 (John Wiley & Sons, Inc., 1972).
L. A. Haas et al., "Removing Sulfur Dioxide by Carbon Monoxide Reduction", Report of Investigations 7483, (U.S. Department of Interior, Bureau of Mines, 1971).
Kirk-Othmer Encyclopedia of Chemical Technology, Second Ed., vol. 19, 415 (J. Wiley & Sons, Inc., 1969).
V. V. Pechkovski et al., "Sulfidizing of Iron Oxides by Sulfur Dioxide in Presence of Carbon", Zhurnal Prikladnoi Khimii, vol. 38, No. 6, pp. 1199–1206, (Jun., 1965).
J. W. Town et al., "Removing Sulfur Dioxide from Flue Gases", Report of Investigation 7478 (U.S. Department of Interior, Bureau of Mines, Washington, D.C., 1971).

Primary Examiner—Gregory A. Heller
Attorney, Agent, or Firm—Maky, Renner, Otto & Boisselle

[57] ABSTRACT

A process to remove $SO_2$ from mixtures by contacting $SO_2$-containing mixtures with a regenerable iron-bearing sorbent such as paint rock under reaction conditions to produce iron sulfide and an effluent containing reduced amounts of $SO_2$.

28 Claims, 1 Drawing Figure

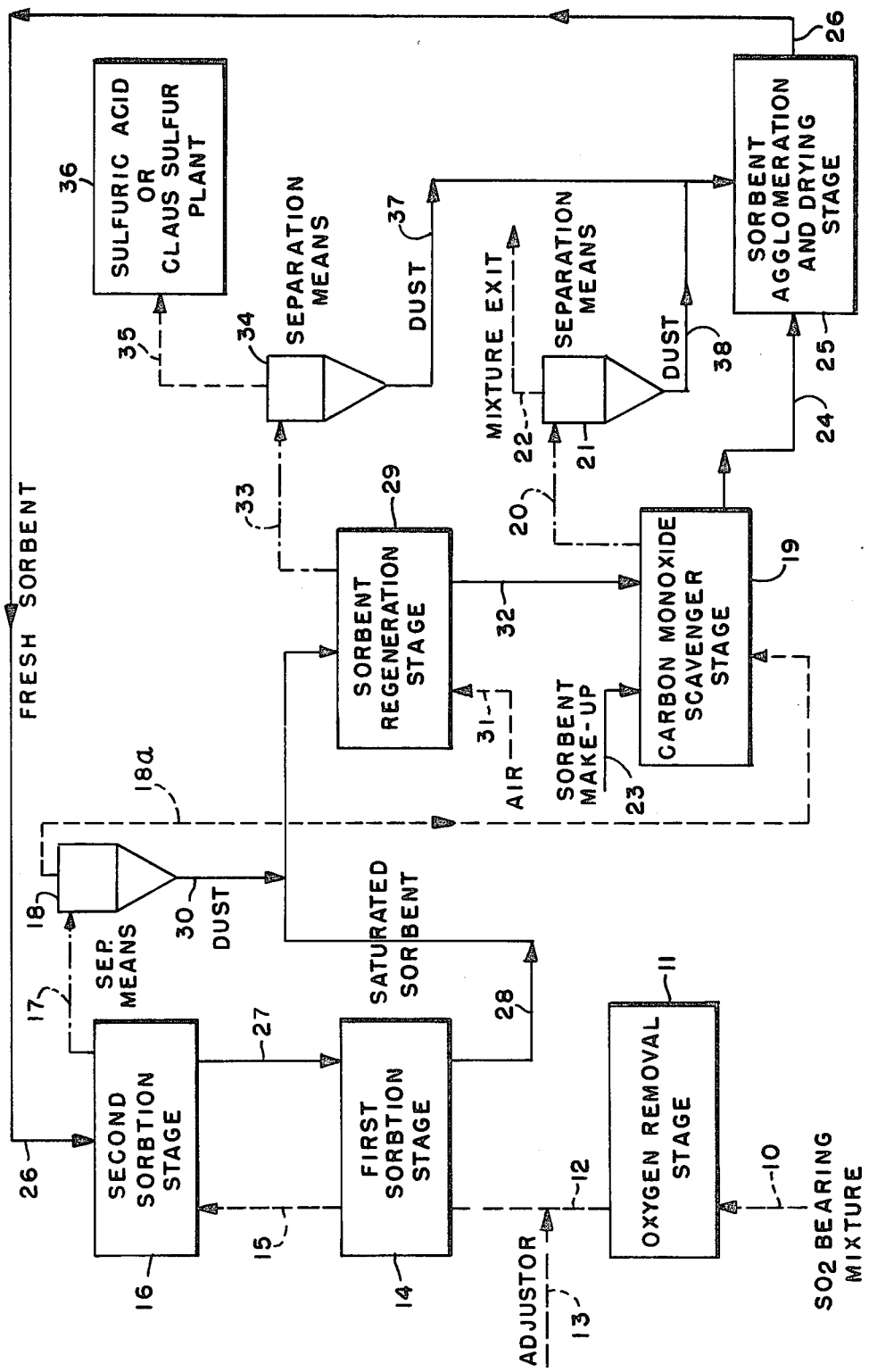

DRY SCRUBBING OF SO₂ FROM MIXTURES

BACKGROUND OF THE INVENTION

This invention relates to an improved process for removing sulfur dioxide ($SO_2$) from mixtures, especially dilute gaseous mixtures containing less than 1% sulfur.

Many processes are known for the removal of sulfur dioxide from mixtures. These processes include $SO_2$ removal from dilute flue gas mixtures such as those produced by power utilities as a by-product from burning sulfur-containing coal or oil. Known processes take a variety of approaches including both wet and dry scrubbing as well as catalytic oxidation, adsorption and even in situ reactions with burning fuel. See generally, the Kirk-Othmer Encyclopedia of Chemical Technology, Second Ed., Vol. 19, 415 (J. Wiley and Sons, Inc., 1969).

In the article, L. A. Haas et al, "Removing Sulfur Dioxide by Carbon Monoxide Reduction", Report of Investigations 7483, U.S. Dept. of the Interior, Bureau of Mines (1971), a catalytic process is described which employs an iron-alumina mixture as a catalyst in the reaction of $SO_2$ with carbon monoxide (CO) to produce carbon dioxide and elemental sulfur. This article further states that only small quantities (less than 0.5%) of oxygen can be tolerated without impairing the reaction.

U.S. Pat. No. 4,238,466 describes a process for removing sulfur dioxide from a gas which contains oxygen by contacting the gas with a ferrous sulfate sorbent at a temperature between 300°-500° C. with an $O_2/SO_2$ ratio of about 1.

Several patents describe the use of iron oxide as a sorbent to remove sulfur dioxide from mixtures containing both sulfur dioxide and oxygen. See, e.g., U.S. Pat. Nos. 3,917,800; 4,008,169; and 4,010,239. There is, however, a continuing need to develop better methods of removing $SO_2$ from mixtures, in particular, dilute flue gases. Such improved methods may promote the societal goals of reducing environmental pollution, economic recovery of waste by-products, and efficient use of raw materials, through cheaper, simpler, and more effective processes.

SUMMARY OF THE INVENTION

The present invention comprises a non-catalytic process for removing $SO_2$ from a feed mixture by contacting a substantially oxygen-free, $SO_2$-containing feed mixture with an iron-bearing sorbent in the presence of a reducing agent, under reaction conditions, to produce an effluent containing a reduced amount of sulfur-containing components relative to the amount of these components originally in said feed mixture.

Generally, this process may advantageously further incorporate: (a) an oxygen removal step to prepare the feed mixture for sorbent contact; (b) a regeneration step to recycle spent sorbent and recover sulfur; and/or (c) a carbon monoxide removal step to further purify the effluent. It has been found that sufficient sorbent surface area and iron content, along with the absence of oxygen greatly enhance the beneficial use of this invention and are critical to its economic utility. It has been further established that an abundant, naturally occurring raw material, known as paint rock, may be efficiently employed as a sorbent of preference. Paint rock is commonly available in the United States in very large quantities at low cost. Although there are various grades of paint rock, those grades having a combination of high surface area and high iron content are the most advantageous. A beneficial aspect of the present invention is that a cheap, abundant, readily available, raw material such as paint rock may be employed as a sorbent with relatively little prior processing when compared to prior art processes. It is believed that sulfur dioxide is sorbed by the process of the invention to form one or more iron sulfides: "$FeS_x$". While "x" may be denoted "1" or "2", it is recognized in the art that nonstoichiometric quantities are also meant by these labels: $Fe_x$, $FeS$ and $FeS_2$. See e.g. Cotton et al, *Advanced Inorganic Chemistry*, 3rd Ed., at 433 (John Wiley & Sons, Inc., 1972).

BRIEF DESCRIPTION OF THE DRAWING

The drawing is a schematic representation of an embodiment of the invention.

DETAILED DESCRIPTION OF THE INVENTION

The invention employs as a sorbent an iron-bearing material. Suitable iron-bearing materials include metallic iron, magnetite ($Fe_3O_4$), pyrrhotite (FeS), paint rock ($Fe_2O_3$), etc., and mixtures thereof. The iron-bearing material is the active component of the sorbent. It is preferable that a sorbent with as high of an iron content as possible while maintaining concurrently a high surface area be chosen. It has been found that paint rock (also known as "ocher") may be advantageously employed. However, any iron-bearing material having a high surface area and able to effectively combine with sulfur is suitable. A typical sample of paint rock has a composition similar to that given in Table I.

TABLE I

| TYPICAL PAINT ROCK COMPOSITION | |
|---|---|
| Component | Weight % |
| Fe | 45–55 |
| $SiO_2$ | 7–15 |
| $Al_2O_3$ | 4–8 |
| Mn | .3–1.0 |
| MgO | .1–.5 |
| CaO | .1–.5 |
| S | .02–.07 |

Note that although iron is typically present as an oxide in paint rock, it is expressed in terms of iron content due to the probable existence of several different oxides in varying proportions.

These iron-containing sorbents are relatively economical when compared to the limestone components commonly found in present-day combustion gas scrubbers. Furthermore, as mentioned above, iron-bearing sorbents are abundant, and easily obtained.

Naturally occurring paint rock is a good absorber which has a high surface area—generally about 15 to about 100 square meters per gram ($m^2/g$). This range of surface area is suitable for purposes of the present invention. Beneficially, a surface area of about 40 $m^2/g$ or higher may be used.

Sorbent may also include a binder or other additives to enhance its utility. Typically, binders are employed as an aid in agglomeration. Suitable binders are clays such as bentonite as well as sodium silicates such as water glass. In particular, bentonite may be advantageously utilized due to its being relatively inexpensive while also containing as a typical component some iron. This iron may also contribute to sorption. Binders or additives that decompose easily or which greatly reduce the surface area of the sorbent should be avoided.

Agglomeration is an important step in the preparation of the sorbent. Sorbent particles are agglomerated in order to maximize process efficiency. Particles which are too small necessitate dust removal to prevent emission of particulates with the effluent. Particles which are too large have less surface area thereby requiring more sorbent to obtain an equivalent number of active sites for sorption. Also, a large size makes suspension of particles difficult in a fluidized bed reactor. Another problem which may be encountered due to improper particle size is excessive pressure drop in the reactor thereby reducing the economic efficiency of the process. The optimum size range of agglomerated particles should be determined experimentally since it will depend upon the other process parameters chosen such as reactor size, flow rates, etc. Generally, however, a range of about $-10$ to $+65$ mesh (all mesh sizes based upon the Tyler mesh scale unless otherwise noted) is believed to be suitable. Good results are obtainable with a range of about $-14$ to $+28$, with a preferred size range believed to be from about $-28$ to $+65$ mesh. The invention is operable outside these ranges, but efficiencies will vary and generally will be less (depending upon the other parameters). Use of a broad range of particle sizes should aid in fluidization.

Preferentially, finely powdered paint rock may be agglomerated with water and bentonite to produce agglomerated particles having high surface area. For example, a typical sorbent may be formed in the following manner: About 0.25–1.0 percent by weight bentonite is added to paint rock, then blended and agglomerated. Blending may be accomplished by use of a balling disc or a mechanical blender such as a ribbon, or twin-shell blender. Depending upon the type of blender used, some water may be added during blending according to commonly-known techniques. Optionally, the blended material may be further treated or compacted by a device such as a Muller mixer. Agglomeration is preferably carried out in a balling disc, however any agglomerating device is suitable. Enough water should be added during the agglomerating procedure to produce a product which contains about 10–15% by weight of water. Less water tends to cause the agglomerates to be irregular and fall apart more easily, while more water tends to cause undesirable clustering or a sticking together of the particles. In any case, proper agglomeration may be easily determined by routine experimentation to produce sorbent particles suitable for use with the inventive process, particularly, with a fluidized bed reactor. Particles so agglomerated, should retain high surface area and any treatments which reduce surface area below 10 m²/g should be avoided. It is very desirable that sorbent agglomerates have both a high iron content and a high surface area. Thus, modifications such as sintering or calcination should not be employed since they may cause an unacceptable (to less than 10 m²/g) loss of surface area. Similarly, unnecessary dilution of the iron content by such ingredients as alumina or silica should be avoided. Advisedly, the content of alumina and similar materials which dilute the iron content should remain well below 50 weight percent. Sorbents made from agglomerated paint rock and bentonite should beneficially have an agglomerated surface area of 10 m²/g or higher, and preferably 20 m²/g or higher.

The process of this invention sorbs sulfur dioxide, particularly, from dilute gaseous mixtures. A suitable $SO_2$-containing mixture for a process of the invention is a mixture obtained from burning fossil fuels such as coal. Commonly, coal containing up to about 4% by weight sulfur is burned with an excess of oxygen thereby giving off an oxygen and $SO_2$-containing gaseous mixture. This gaseous mixture generally will have in addition to a dilute $SO_2$ content approximately 3–5% by volume oxygen gas. This oxygen gas should be removed since it interferes with efficient conversion of sulfur dioxide to the various iron sulfides by the process of the invention. An oxygen removal reactor may be conveniently constructed for this purpose by passing the gaseous mixture through any convenient reactor such as a fluidized bed reactor containing a suitable carbonaceous reactant such as coke under reaction conditions. Generally, elevated temperatures in the vicinity of about 700° C. are utilized. This temperature may be self-sustained due to exothermal reactions which occur. Also, at these temperatures residual volatiles present in the carbonaceous reactants may also be removed by reaction with oxygen. However, the primary reactions which occur are:

$$C + O_2 \rightleftharpoons CO_2$$

$$CO_2 + C \rightleftharpoons 2CO$$

The treated mixture should now be substantially free from oxygen gas. A mixture is substantially free of $O_2$ when the remaining amount of oxygen gas is minimal, (i.e., that which will not interfere with an efficient or economical use of the process of the invention). Generally, oxygen levels of less than 0.5% by volume are acceptable with no detectable oxygen preferred.

Advantageously, oxygen removal by conversion to carbon monoxide assists in supplying a necessary ingredient for the sorption process, viz., a reducing agent. The iron-bearing sorbent will only sorb $SO_2$ efficiently in the presence of a reducing agent such as carbon monoxide, hydrogen or mixtures thereof. Preferably, the reducing agent will be admitted to the sorbent reaction zone with the $SO_2$-containing mixture. Use of carbon monoxide is preferred and the $CO:SO_2$ molar ratio should be adjusted to obtain a suitable ratio of about 1–4, and preferably 2–3 in order to maximize scrubbing efficiency. $CO:SO_2$ molar ratios outside these ranges have several disadvantages including decreasing sorption of $SO_2$ and production of high levels of residual CO thereby necessitating CO removal. By proper temperature control of the above-described oxygen removal reactor, the desired $CO:SO_2$ molar ratio may be adjusted. For mixtures having low oxygen content, or other situations where the CO conversion of the original mixture is insufficient, additional CO may be added.

Once a $SO_2$-containing, substantially oxygen-free, mixture is obtained, it is brought into contact with an iron-bearing sorbent under reaction conditions to effect $SO_2$ removal. For example in a reactor containing metallic iron, magnetite and pyrrotite, the following reactions are believed to occur:

$$Fe° + SO_2 + 2CO \rightleftharpoons FeS + 2CO_2$$

$$Fe_3O_4 + 3SO_2 + 10CO \rightleftharpoons 3FeS + 10CO_2$$

$$Fe_3O_4 + 6SO_2 + 16CO \rightleftharpoons 3FeS_2 + 16CO_2$$

$$FeS + SO_2 + 2CO \rightleftharpoons FeS_2 + 2CO_2$$

The sorption reaction may be carried out over a wide range of temperature. The operational temperature will depend upon the particular parameters chosen for the process including, but not limited to, the efficiency of the particular sorbent chosen. Generally the sorption reaction will be conducted at a temperature within a suitable range of about 300°–600° C., and preferably at about 400°–500° C. Too low or too high of a temperature will reduce the efficiency of the process. High temperatures in particular, should be avoided to prevent unnecessary sintering and loss of surface area.

A suitable contact time for the sorption reaction zone is expected to be from about 0.10–0.50 seconds. However, reaction parameters such as contact time, temperature, etc., will generally be based upon practical considerations such as convenience, economy, particular compositions used, as well as other process variables chosen. In any case, the optimum values chosen for each set of reaction conditions and type sorbent is easily determined by one skilled in the art.

Following reaction with the iron-bearing sorbent, an effluent reduced in sulfur content is produced. Ideally, this effluent will contain no sulfur or sulfur dioxide. However, as a practical matter, the sulfur and $SO_2$ content will be as low as possible to effect the goals of $SO_2$ removal, e.g., clean air, economic recycling of sulfur, EPA standards, etc. If the desulfurized mixture is a flue gas from a coal-burning power plant, it is desirable that the effluent be pure enough to release into the atmosphere. However, under certain conditions, residual carbon monoxide may be present in undesirable quantities following the sorption step thereby necessitating a carbon monoxide removal step to reduce CO amounts to an acceptable level. Such a system may be easily incorporated by passing the effluent through another reactor containing $Fe_2O_3$ or other iron-bearing sorbents at about 300°–600° C. and preferably 400°–500° C. Due to the low $CO:CO_2$ molar ratio in the gases leaving the $SO_2$ sorption reactor, the most effective mechanism for CO removal is believed to be:

$$3Fe_2O_3 + CO \rightleftharpoons 2Fe_3O_4 + CO_2$$

Now, the effluent may be safely released to the atmosphere with perhaps only an additional filtration step to remove particulates.

After a period of operation passes, the efficiency of the sorbent utilized will decrease. This is due to exhaustion of the sorbent for a variety of reasons such as conversion to iron sulfides or a loss of surface area. Therefore, a further advantage of the present invention is that the iron-bearing sorbent may be regenerated for reuse.

The invention may be operated in either batch or continuous format. In a continuous process, exhausted sorbent is continually removed and fresh (or regenerated) sorbent is continually added to maintain high scrubbing efficiency, while the exhausted sorbent undergoes regeneration. The iron sulfides may be regenerated by roasting in air or an oxygen-containing mixture to produce iron oxides such as $Fe_2O_3$, or $Fe_3O_4$, as well as $SO_2$. This roasting step may beneficially be performed at about 500°–600° C. At temperatures below 500° C., the regeneration reaction becomes difficult, while at high temperatures above 600° C., surface area may be reduced due to sintering. It is not critical to remove all sulfur from the sorbent. Instead, for practical reasons, it is better to continue roasting only so long as a strong $SO_2$ stream is generated. This stream may then be utilized to produce a commercially saleable material such as sulfuric acid or sulfur. In any case, reduction in surface area should be avoided, since both sorption and regeneration processes work best with high surface area. In spite of precautions against sintering, some loss of surface area may be unavoidable. If this occurs, a flash grinding operation, typically with a ball mill, may be used to delump or break-up sorbent particles. Too much grinding, however, will increase costs due to higher energy consumption and also produce fine particles requiring reagglomeration or removal.

The following examples are given to illustrate the advantages of the invention, but should not be construed as limiting the scope.

In each of the following examples (and throughout the specification), mesh sizes are given according to the Tyler scale and percentages are given in weight percent for solids and volume percent for gases unless otherwise noted. Also, analyses are made according to generally accepted methods of analysis including: the BET method for determining surface areas; atomic absorption; gas chromotography using thermal conductivity detectors; and iodide-starch titration.

EXAMPLE 1

A simulated stack gas analyzing 0.3% $SO_2$, 3.3% $O_2$, 15.5% $CO_2$ and 80.9% $N_2$ is passed through a bed having about 500 grams of coke. Oxygen removal is measured at different temperatures. The coke particle size is a −6 to +28 mesh fraction. The total gas flow rate is about 32 standard liters per minute through a two-inch I.D. reactor. After removal of residual volatiles in the coke, the oxygen removal is as follows.

| Temp. °C. | $O_2$ Consumed, % |
|---|---|
| 500 | 9.0 |
| 600 | 30.0 |
| 700 | 97.0 |

With this fine sized coke, the gas free board space velocity at 700° C. is about 2.8 feet/second. At 700° C., the temperature is self-sustained and the CO level in the off gases is about 0.6%.

The above example demonstrates that oxygen removal can be effectively performed at about 700° C. using a coke bed.

EXAMPLE 2

A sample of "Paint Rock" ground to −150 mesh is agglomerated with about 1% bentonite. The −28 to +65 mesh agglomerates are used as sorbent. The −150 mesh "Paint Rock" has a specific surface area of about 39 m$^2$/g and the following approximate chemical composition: 50.2% Fe, 10.6% $SiO_2$, 5.9% $Al_2O_3$ and 0.07%$_2$S. The agglomerates have a specific surface area of about 20 m$^2$/g.

An approximately 500-gram sample is heated to about 450° C. and prereduced for about two (2) hours with a gas flow rate of about 40 liters per minute (LPM) analyzing approximately: 17.2% CO, 7.2% $CO_2$ and 75.5% $N_2$. At the end of the two hours, the flow rate and composition of the gas are adjusted to approximately 31 LPM and 0.3% $SO_2$, 1.2% CO, 15% $CO_2$, and 83.5% $N_2$. In the two inch I.D. reactor this gas flow rate at about 450° C. results in a space velocity of about 2.0 ft/sec and a collapsed bed contact time of about 0.25 seconds.

The absorption efficiency as a function of time is as follows:

| Cum. Time Hr. | SO$_2$ in Off Gas, ppm | Scrubbing Efficiency, % |
|---|---|---|
| 1/15 | 60 | 97.9 |
| ½ | 60 | 97.9 |
| 1 | 150 | 95.0 |
| 2 | 180 | 94.1 |
| 4 | 350 | 89.1 |
| 8 | 480 | 84.3 |
| 12 | 678 | 77.4 |
| 16 | 988 | 66.9 |
| 20 | 1,200 | 59.9 |
| 26 | 1,800 | 41.9 |

The above data indicates that two properly designed stages of absorption should allow a reduction in the SO$_2$ level down to about 200–300 ppm from a feed mixture analyzing around 0.3% SO$_2$ (3,000 ppm). The saturated sorbent is expected to contain in excess of about 20% sulfur in the form of sulfides.

EXAMPLE 3

An iron ore filter cake ground to about −200 mesh is agglomerated with approximately 1% bentonite, and −28 to +65 mesh agglomerates are used as sorbent. The −200 mesh iron concentrate has a specific surface area of about 14 m$^2$/g and the following approximate chemical composition: 61.3% Fe, 7.8% SiO$_2$, 0.9% Al$_2$O$_3$, and 0.05% S. The agglomerates specific surface area is about 25 m$^2$/g.

An approximately 500-gram sample is heated to about 550° C. and prereduced for one (1) hour with the same flow and gas composition as in Example 2. Then the gas composition is adjusted for absorption as in Example 2, resulting in a space velocity of about 2.3 ft/sec at 550° C. and a collapsed bed contact time of about 0.22 seconds.

The absorption efficiency as a function of time is as follows:

| Cum. Time Hr. | SO$_2$ in Off Gas, ppm | Scrubbing Efficiency, % |
|---|---|---|
| 1/15 | 90 | 97 |
| ½ | 300 | 90 |
| 1 | 600 | 80 |
| 2 | 660 | 78.7 |
| 4 | 740 | 75.3 |
| 6 | 710 | 77.8 |
| 8 | 800 | 75.8 |
| 10 | 730 | 75.6 |

EXAMPLE 4

Another sample of the sorbent used in Example 3 is tested at 350°, 400°, and 450° C. after about two hours of prereduction. At these temperatures, the gas space velocities are approximately 1.7, 1.9 and 2.2 ft/sec for collapsed bed contact times of about 0.29, 0.26 and 0.22 seconds respectively.

The absorption efficiencies as a function of time and temperature are as follows:

| Temp. °C. | Cum. Time Hr. | SO$_2$ in Off Gas, ppm | Scrubbing Efficiency, % |
|---|---|---|---|
| 350 | 1/15 | 270 | 89.2 |
| | ½ | 1,800 | 41.9 |
| | 1 | 2,100 | 32.3 |
| | 1½ | 2,400 | 25.0 |
| | 2 | 2,480 | 29.1 |
| 400 | 2½ | 1,200 | 60.0 |
| | 3 | 1,290 | 57.0 |
| | 3½ | 1,520 | 49.3 |
| | 4 | 1,480 | 50.7 |
| | 4½ | 1,500 | 50.0 |
| 450 | 5 | 760 | 72.9 |
| | 5½ | 820 | 72.7 |
| | 6 | 840 | 72.0 |
| | 6½ | 900 | 70.0 |
| | 7 | 1,120 | 61.4 |

The significant increase in efficiency with increasing temperature indicates the process is primarily chemically controlled.

EXAMPLE 5

A fresh approximately 750-gram sample of −14 to +28 mesh agglomerated "Paint Rock" is used as a CO scavenger at about 350° C. The gas contains about 0.25% CO, 10% CO$_2$ and 89.75% N$_2$ and is fed at 200 standard cubic feet per minute (SCFM) which results in a space velocity of about 1.65 ft/sec in a collapsed bed contact time of about 0.2 seconds. During the first two hours, the average carbon monoxide scavenging is about 90% thus reducing the carbon monoxide from 0.25% (2500 ppm) to about 250 ppm.

Referring now to the drawing, an SO$_2$ bearing mixture such as the effluent gas from a power production facility is introduced via transfer means 10 to an oxygen removal stage 11. This oxygen removal stage 11 typically is a coke bed at about 600° to about 750° C. The mixture sans oxygen is then transferred via transfer means 12 to a first sorption stage 14 with the amount of reducing agent, typically carbon monoxide, contained in the mixture adjusted by adjustor means 13 which is connected to transfer means 12. The treated mixture from the first stage 14 is transferred via transfer means 15 to a second sorption stage 16. Both stages are operated under reaction conditions to cause the iron-bearing sorbent contained therefor to sorb SO$_2$ from the feed mixture. The effluent from the second stage 16 is transferred via transfer means 17 to separation means 18 where solids are separated out of the mixture. The remaining mixture is then passed via transfer means 18a to a carbon monoxide scavenger unit 19 where levels of carbon monoxide are reduced by reaction with fresh and/or regenerated sorbent. The mixture has now been treated for removal of O$_2$, SO$_2$, and CO and is transferred via means 20 to separation means 21 for dust removal. The dustless, purified mixture may then be introduced to the environment via exit means 22.

Sorbent is supplied to the process through sorbent make-up means 23 to the carbon monoxide scavenger 19. This sorbent typically is an iron-bearing ore such as Paint Rock. This make-up sorbent, along with regenerated sorbent contained in scavenger stage 19, are then transferred via transfer means 24 to a sorbent agglomeration and drying stage 25. From agglomeration stage 25 agglomerated sorbent is readmitted to the second sorption stage 16 via transfer means 26 and after a time, passed by conveyor means 27 to first sorption stage 14.

Saturated sorbent is then transferred from first stage 14 via conveyor means 28 to the sorbent regeneration stage 29. Added to the saturated sorbent conveyed by conveyor means 28 are dust and particulates from separation means 18 via transfer means 30. The combined dust, particulates and saturated sorbents are roasted during the sorbent regeneration stage with admission of air or other oxygen-containing gases via means 31. Regenerated sorbent is then transferred via means 32 to the carbon monoxide scavenger stage 19. During the regeneration stage 29, a concentrated $SO_2$ stream is produced which is transferred via means 33 to separation means 34 whereupon the sulfur-bearing gas is transferred via transfer means 35 to a sulfuric acid or claus sulfur plant 36. Dust removed by separation means 34 transferred via transfer means 37 to the sorbent agglomeration and drying stage 25 where they are joined by dust and particulates from separation means 21 via transfer means 38. The drawing and above description describes a simple, efficient method of advantageously utilizing the process of the invention.

Further modifications of the invention disclosed will be apparent to those skilled in the art and all such modifications are deemed to be within the scope of the invention as defined by the following claims.

I claim:

1. A non-catalytic process for removing $SO_2$ from a feed mixture, which is substantially free of oxygen gas, comprising passing an $SO_2$-containing feed mixture through an iron-bearing sorbent, said iron-bearing sorbent having a total iron content of at least about 45% by weight, in the presence of a reducing agent, the molar ratio of said reducing agent to $SO_2$ being about 2-3, under effective reaction conditions to produce at least one sulfur containing iron compound and an effluent having a reduced sulfur content relative to said feed mixture.

2. A process as defined in claim 1, wherein said reducing agent is carbon monoxide, hydrogen or mixtures thereof.

3. A process as defined in claim 1, wherein said reducing agent is carbon monoxide.

4. A process as defined in claim 1, wherein said iron-bearing sorbent has a surface area of at least 10 $m^2/g$.

5. A process, as defined in claim 1, wherein said iron-bearing sorbent comprises metallic iron, at least one iron oxide, pyrrhotite, or mixtures thereof.

6. A process as defined in claim 1, wherein said iron-bearing sorbent comprises paint rock.

7. A process as defined in claim 3, wherein said reaction conditions comprise:
   (a) a $CO/SO_2$ molar ratio of about 2:3;
   (b) at a temperature in the range of about 300°-600° C.;
   (c) with a sorbent contact time of about 0.1-0.5 seconds;
   (d) said sorbent having a surface area of about 15-100 $m^2/g$; and
   (e) said feed mixture having an oxygen gas content of less than 0.3 percent by volume.

8. A process as defined in claim 1, further comprising a pretreatment step for removal of oxygen gas wherein said feed mixture is formed from a crude feed mixture which contains both $SO_2$ and $O_2$, and said crude mixture is treated by passing the crude feed mixture through a carbon-containing reactor under reaction conditions to produce at least one oxide of carbon and a substantially oxygen-free, $SO_2$-containing feed mixture prior to passage of said feed mixture through said iron-bearing sorbent.

9. A process as defined in claim 8 further comprising contacting said effluent with $Fe_2O_3$ under reaction conditions to remove carbon monoxide.

10. A process as defined in claim 1, further comprising a sorbent regeneration step wherein said sulfur containing iron compounds formed in the process are removed from contact with said feed mixture and then oxidized to form iron oxides and concentrated $SO_2$.

11. A non-catalytic process for removing $SO_2$ from a gaseous mixture containing up to about 1.0 percent $SO_2$ and up to about 5.0 percent oxygen comprising:
   (a) contacting said mixture with a carbonaceous material under reaction conditions to produce at least one oxide of carbon and a first effluent that is substantially free of oxygen gas, said first effluent having a $CO:SO_2$ molar ratio of about 2-3;
   (b) contacting said first effluent with iron-bearing sorbent having a total iron content of at least about 45% by weight, in a fluidized bed, under reaction conditions that convert at least a portion of said sorbent to iron sulfides; and
   (c) removing from said fluidized bed an effluent gas containing less than about 0.05 percent $SO_2$.

12. A process as defined in claim 11, wherein said iron-bearing sorbent comprises metallic iron, at least one oxide of iron, or mixtures thereof.

13. A process as defined in claim 12, wherein said sorbent further comprises a binder.

14. A process as defined in claim 11, wherein said sorbent has a surface area of at least 20 $m^2/g$.

15. A process as defined in claim 14, wherein said sorbent comprises paint rock.

16. A process as defined in claim 15, wherein said sorbent is agglomerated with bentonite and has an agglomerated sorbent mesh size of from about −10 to +65.

17. A process as defined in claim 14, wherein said reaction conditions for step (b) include reacting at a temperature in the range from about 350°-600° C.

18. A process as defined in claim 17, wherein said reaction conditions for step (b) include reacting in the presence of carbon monoxide at a $CO/SO_2$ molar ratio from about 2-3.

19. A non-catalytic process for removal of $SO_2$ from a mixture by formation of FeS, $FeS_2$ or mixtures thereof comprising contacting a feed mixture which contains (i) $SO_2$ and (ii) less than 0.5 percent by volume oxygen gas with an iron-bearing sorbent having a total iron content of at least about 45% by weight and a reducing agent, the molar ratio of said reducing agent to $SO_2$ being about 2-3, under reaction conditions to produce one or more iron sulfides and an effluent stream having an $SO_2$ content of less than 0.05 percent.

20. A process as defined in claim 19, wherein said reducing agent is carbon monoxide.

21. A process as defined in claim 20, wherein said iron-bearing sorbent further comprises a binder.

22. A process as defined in claim 21, wherein said binder is bentonite.

23. A process as defined in claim 21, wherein said sorbent has a surface area of 20-100 square meters per gram.

24. A process as defined in claim 20, wherein said reaction conditions comprise reacting at a temperature in the range of about 300° to about 650° C.

25. A process as defined in claim 23, wherein said reaction conditions comprise reacting at a temperature in the range of about 400° to about 500° C.

26. A process as defined in claim 25, wherein said iron-bearing sorbent comprises paint rock.

27. A process as defined in claim 26, wherein said iron-bearing sorbent comprises agglomerates having a Tyler mesh size between about −28 to about +65.

28. A process as defined in claim 27, wherein said carbon monoxide and said $SO_2$ are introduced to the sorbent in a molar ratio of about 2–3.

* * * * *